United States Patent [19]

Chatlos

[11] Patent Number: 4,608,915
[45] Date of Patent: Sep. 2, 1986

[54] ATTACHMENT FOR MOTOR VEHICLES WITH REAR WINDOWS

[75] Inventor: Richard Chatlos, Johnstown, Pa.

[73] Assignee: Air-O-Scoop Corporation, Johnstown, Pa.

[21] Appl. No.: 702,137

[22] Filed: Feb. 15, 1985

Related U.S. Application Data

[63] Continuation-in-part of Ser. No. 514,198, Jul. 15, 1983, Pat. No. 4,503,756, which is a continuation-in-part of Ser. No. 377,564, May 12, 1982, Pat. No. 4,393,753, which is a continuation of Ser. No. 194,224, Oct. 6, 1980, Pat. No. 4,346,648, which is a continuation-in-part of Ser. No. 118,444, Feb. 4, 1980, Pat. No. 4,326,451.

[51] Int. Cl.$^4$ .............................................. B60H 1/26
[52] U.S. Cl. ..................................... 98/2.12; 98/99.4
[58] Field of Search ................. 98/2, 2.12, 2.13, 2.18, 98/2.19, 99.3, 99.4

[56] References Cited

U.S. PATENT DOCUMENTS

| | | | |
|---|---|---|---|
| 362,051 | 5/1887 | Addoms | 98/99.3 |
| 488,920 | 12/1892 | Cook | 98/99.3 |
| 1,022,870 | 4/1912 | Power | 98/99.4 |
| 1,809,518 | 6/1931 | Kubatzky | 98/99.3 X |
| 1,895,109 | 1/1933 | Suddards | 98/2.12 |
| 2,347,120 | 4/1944 | Mohun | 98/99.3 |
| 2,570,337 | 10/1951 | Gallik | 98/2.13 |
| 2,925,769 | 2/1960 | Kubatzky | 98/37 |
| 3,303,769 | 2/1967 | Williams | 98/2.12 X |
| 3,440,945 | 4/1969 | Mura | 98/2.19 X |

FOREIGN PATENT DOCUMENTS

| | | | |
|---|---|---|---|
| 174935 | 2/1917 | Canada | 98/99.3 |
| 343573 | 2/1931 | United Kingdom | 98/2.19 |
| 519679 | 4/1940 | United Kingdom | |

Primary Examiner—Harold Joyce
Attorney, Agent, or Firm—Fisher, Christen & Sabol

[57] ABSTRACT

An air flow device (replacement window) for motor vehicles or boats with a rear window. The window includes a frame which is adapted to fit in the rear aperture. The window frame has four frame members, top, bottom, and two sides forming a window opening. Optimally at least one pane member is positioned within the window frame as to block a portion of the window opening. The edge of the window frame that contacts the window frame is vertical. The device when positioned in the window frame includes a transparent plate in the central region. Attaching the air flow device to the window frame's bottom includes a pivoted portion of the plate to the bottom window frame's member. There are two vertical side members. Each side is attached to one of the vertical members, and the other side is attached to one end of the plate. Each side member is pleated in the vertical direction. The pleats decrease in width in the vertical direction to form a point at the lower edge while the upper vertical member's edge is straight. When the plate in an upright position closes the rear aperture, the pleats of the vertical side members are compressed. When the plates is in an inwardly pivoted position and extends upwardly/inwardly from the rear aperture, it forms a gap between the top of the plate and the vertical plane's rear aperture, the pleats of the vertical side members are expanded, preventing lateral air flow.

6 Claims, 1 Drawing Figure

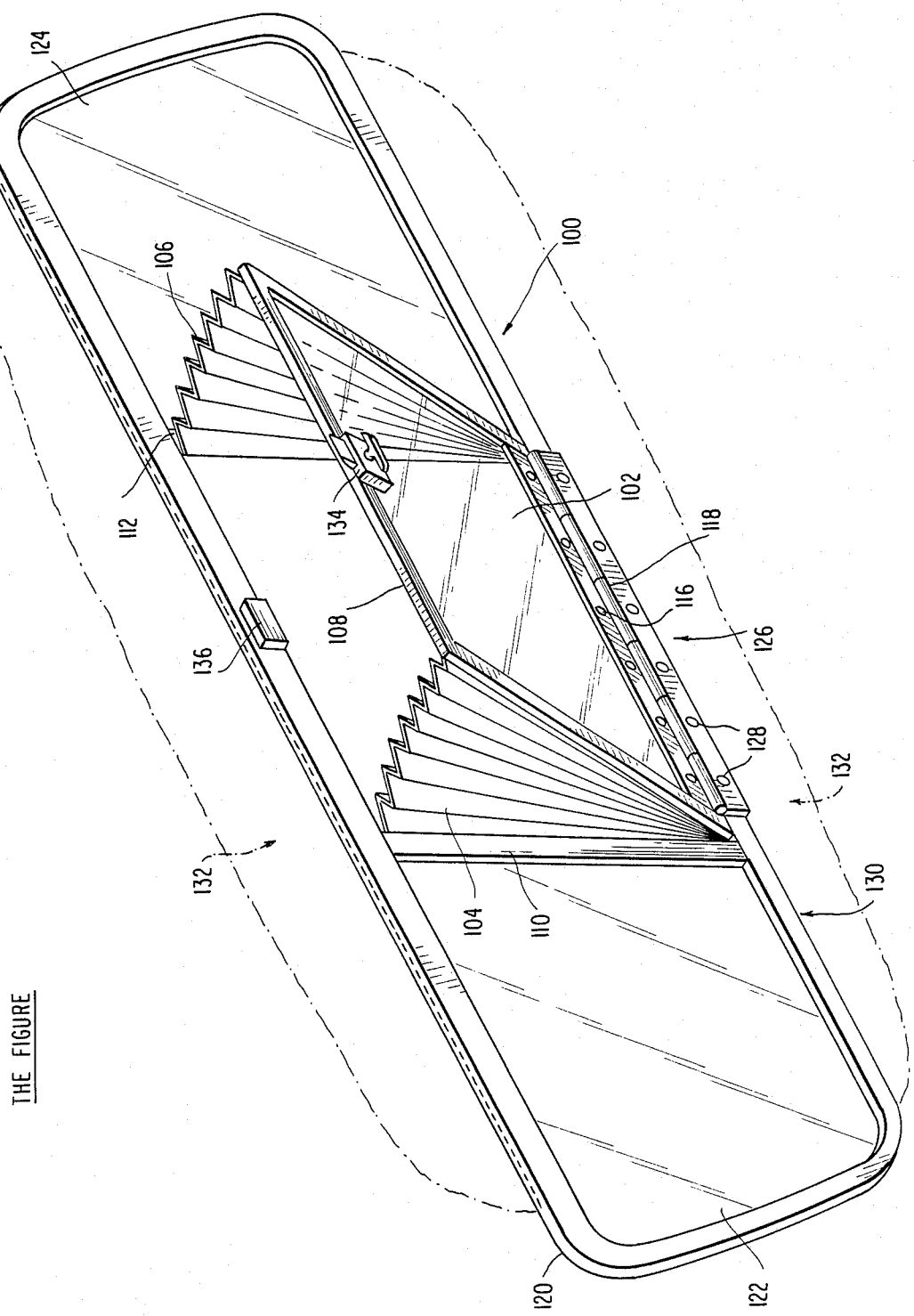
THE FIGURE

ATTACHMENT FOR MOTOR VEHICLES WITH REAR WINDOWS

This is a continuation-in-part of application Ser. No. 514,198, filed on July 15, 1983, now U.S. Pat. No. 4,503,756, which is a continuation-in-part of application Ser. No. 377,564, filed on May 12, 1982, now U.S. Pat. No. 4,393,753, issued on July 19, 1983, which is a continuation of application Ser. No. 194,224, filed on Oct. 6, 1980, now U.S. Pat. No. 4,346,648, issued on Aug. 31, 1982, which is a continuation-in-part of application Ser. No. 118,444, filed on Feb. 4, 1980, now U.S. Pat. No. 4,326,451, issued on Apr. 27, 1982.

BACKGROUND OF THE INVENTION

1. Field Of The Invention

This invention relates to the field of ventilators or air flow devices of motor vehicles.

2. Prior Art

When the rear cab window of a pick-up truck or the like is open, the flow of air can cause soreness of the neck and arms and blow a person's hair. The elimination of these disadvantages and occupant annoyances has been the objective of prior, but unsuccessful inventors, as often the best previous solution had been to shut the rear cab window.

Some of the prior art ventilators allowed the entry of water into the cab or motor coach during rainstorms.

U.S. Pat. No. 1,895,109 (Suddards) teaches a ventilator for the rear window of a closed motor cab, coach and the like. The ventilator has a louver for positioning in the aperture usually occupied by the rear light or rear window. The louver is a number of strips pivotally mounted, each about one edge and operatively connected for movement together. The ventilator also has a deflector screen associated with the louver so as to provide an opening at its upper position. There is a movable flap for controlling the flow of air through the ventilator. The movable flap is mounted for pivotal movement with its free edge cooperating with the upper edge of the deflector screen.

The deflector screen of Suddards is positioned on the inside of the car and the louver is positioned on the outside of the car. Suddards states that its air flow pattern is from inside of the car to outside of the car. To achieve this flow path, it is quite apparent that Suddards would have to open at least one side or front window, at least partially. Flaps or strips D cannot rise above the horizontal due to the top frame of the ventilator, due to the central pivot mounting of the flaps and due to connecting bar F. Since Suddards states his air flow path is from inside of the car outwards, there is no need or desire for flaps D to rise above the horizontal.

Flaps D of Suddards, which do not rise above the horizontal, would effectively render the air flow device of this invention useless by blocking the air flow from over the top of the car, down the back of the car and around, up and through the air flow device of this invention. Suddards asserts an air flow through its ventilator from inside of the car to the outside. Glass louvers present a safety problem for a person riding in the bed of a pick-up truck. Where a camper is mounted in the bed of a pick-up truck, the louvers would totally block air flow and may not even fully open.

Suddards does not have any side panels, which allow air flow through the truck at head and shoulder level of the driver or passenger. This would cause sore arms, neck, etc., and blown hair.

In Suddards, since its ventilator has no side panels, the louver (flaps) must be closed to keep water and snow out. The mounting or installation of Suddards' ventilator would not be easy. There would be poor air quality in a vehicle having Suddards' ventilator. Suddards' ventilator would not be maintenance free, would not be easy to install or would not be easy to remove or clean. In modern vehicles, the rear window is designed altogether differently, making it difficult to install Suddards' ventilator. Suddards' ventilator is not applicable for current recreation vehicles—the design of windows and/or rear windows makes Suddards' ventilator non-applicable for the current design of such windows. Suddards' ventilator has no removable openings or louver flaps for rear view.

In order for passengers to ride in a recreation camper of a pick-up truck, there should be communication with the cab of the recreation vehicle as well as with those in the recreation camper. With the Suddards' louvers, state and federal regulations would not permit louvers in a rear light or rear window of such recreation vehicle and camper. Louvers in a recreation vehicle would hinder communication with passengers in the recreation camper.

U.S. Pat. No. 3,303,769 (Williams) discloses a device for insertion in the front window of a trailer or the like. The device has a transparent window having its upper edge swingably connected to the trailer at the upper edge of front window (or aperture) and extending downwardly and outwardly from the trailer. Williams has specifically designed its system to prevent dust coming into the trailer by keeping a positive pressure in the trailer and filtering the incoming air flow. But the Williams' device has a number of problems or disadvantages. Carbon monoxide and other noxious and toxic gases from the exhaust of the pulling car will be swept right into the trailer through the front window ventilator window of the Williams' device. Also, when it starts to rain, the rain water is thrown up by the car wheels, etc., and will be sucked right into the trailer through the front window ventilator of the Williams' device.

U.S. Pat. No. 2,925,769 (Kubatsky) shows a modified casement window for basements and the like. Kubatsky does not involve a moving vehicle which normally will have a wind factor of up to 55 m.p.h. due to the movement of the motor vehicle. The ventilation problems of a moving vehicle and a stationary basement are hardly related even in concept. Kubatsky deals with a device with which no air flow is involved. Condensation is a problem for Kubatsky. Kubatsky does not specify any kind of air flow and water runoff. If Kubatsky's ventilating window were left open in a rainstorm, water trouble would occur. There is nothing to preent foreign matter from entering the Kubatsky device. When the deflecting shield is open and with wings extending out, the ventilating window is wide open at the top, thus allowing water, bugs, or anything else to enter. In Kubatsky the wings are adjustable, which would cause a rattle in a moving vehicle. Also, there is a strong possibility that water would enter due to the wings of the Kubatsky device.

BROAD DESCRIPTION OF THE INVENTION

An object of the invention is to provide a new and improved air flow device for the rear aperture of motor vehicles. Other objects and advantages of the invention are set out herein or are obvious herefrom to one ordinarily skilled in the art.

The objects and advantages of the invention are achieved by the device of the invention.

This invention involves an air flow device for a closed motor vehicle or boat for positioning in the rear aperture thereof. The air flow device includes a window frame which is adapted to fit in the rear aperture. The window frame has a top frame member, a bottom frame member and two side frame members, thereby forming a window opening. Optionally, at least one pane member is positioned within the window frame so as to block a portion of the window opening. The edge of the window frame which does not contact the window frame is vertical. The air flow unit is positioned in the window frame and includes a plate that is transparent in at least the central region thereof. There is means for attaching the air flow device to the window frame. The attachment means include pivot means which is pivotally attached to the bottom portion of the plate and to the bottom frame member of the window frame. There are two vertical side members, one side of which is attached to one of the vertical members, and the other side of which is attached to one end of the plate. Each of the side members is pleated in the vertical direction. The pleats decrease in width in the vertical direction so as to form a point at the lower edge of said vertical member. The upper edge of the vertical member is straight. When the plate is in an upright position so as to close the rear aperture, the pleats of the vertical side members are compressed. Then, when the plate is in an inwardly pivoted position so as to extend upwardly and inwardly from the rear aperture, thereby forming a gap between the top of the plate and the vertical plane of said rear aperture, the pleats of the vertical side members are expanded, thereby preventing lateral air flow into the vehicle or boat.

Preferably the side members are transparent or translucent, and are made of a pliable material. A vertical strut is preferably affixed on its side to the vertical inner edge of each of the plate members and on its ends to the top member and bottom member of the window frame—the inner edges of the vertical members are attached thereto. A top cover is preferably removably attached to the top edge of the plate and the side members when the device is in the open position, thereby providing a movable cover for the gap. Preferably the plate is essentially flat. Also preferably, all of the plate is transparent.

The invention also involves, in combination, a closed motor vehicle or boat, the motor vehicle or boat having a rear aperture, and an air flow device of the invention mounted on the rear aperture.

When the rear cab window of a pick-up truck or the like is open, the flow of air can cause soreness of the neck and arms and blow a person's hair. These disadvantages and occupant annoyances are eliminated by the device of the invention without having to shut the rear vehicle window.

When the device of the invention is installed in the rear cab window, the window can be left open during rainstorms. Even during a severe rainstorm lasting several hours, no water will enter the cab of the vehicle from the opened rear window. The side windows can be practically shut (or open about ½ inch on each side) during rainstorms, with the result that the side and rear windows and windshield will not fog. The air temperature in the cab will remain comfortable without the use of an air conditioner or dehumidifier. The use of the invention allows one to continue driving during a rainstorm while other vehicles have to pull off the road.

The invention system is designed to provide a comfortable air flow for vehicle occupants. When the invention device is used in the back window of a trailer or a pulling vehicle, even a van, carbon monoxide and other noxious and toxic gases from the exhaust of the pulling vehicle are not swept into the trailer or the pulling vehicle through the back window thereof containing the window device. The invention device does not need screens to protect it from a stone thrown up by vehicle tires and does not need springs. Also, the invention device does not have any condensation problem. The sides or wings of the invention add strength to the shield (center plate) and prevent water and foreign matter from entering the vehicle.

The invention involves a moving vehicle which normally will have a wind factor of up to 55 m.p.h. due to the movement of the motor vehicle. The ventilation of moving vehicles presents special problems. The invention device is positioned, in use, in a moving object and provides a flow of air directed over the heads of driver and passenger for comfort. There is no comparison between a basement ventilating (casement) window and the invention air flow device. The air flow of a device such as that of Kubatsky would not be practicable for the driver and passenger of a pick-up truck with sliding glass windows.

The air flow device of the invention (except for the flexible, pleated sides) can be made out of all plastic or out of all aluminum or out of all metal or combined plastic with aluminum or plastic with metal. It can be produced out of an aluminum frame with center made of a durable transparent plastic or glass. Its basic materials are aluminum or plastic or both combined or metal combined plastic with aluminum or plastic with metals. It is lightweight in nature and durable—this feature makes it maintenance free. The flexible side members can be made of any material, e.g., pliable plastic, textile, rubber, etc., which allows the construction of flexible pleats. The nature of the air flow device makes it simple to install. The air flow device allows air to flow in the vehicle without hindering passengers riding in the vehicle. The air flow device allows air to be distributed in vehicle or recreation vehicle which results in making the driver and/or passengers very comfortable. It is preferable that the entire bake plate of the air flow device be constructed of clear plastic so as to give the driver of the vehicle a clear view of rear traffic. The center of or the entire back plate should be made of a clear durable plastic in order for the air flow device to pass state and federal inspections. Since some vehicles contain a closed-in camper, the sight from the rear view mirror is obstructed on such type of vehicle and is replaced by side view mirrors. It would be up to the choice of the owner if he desires the air flow device to be all aluminum or all plastic model or metal or a combination of all three. The air flow device can be designed and constructed to accommodate all vehicles and/or recreation vehicles with a rear window. At the top of the air flow device, when it is in the open position, where the air enters the vehicle, a screen can be inserted to prevent foreign matter or insects from entering the vehicle.

Permanent installation of the air flow device in a rear window can be done in several ways. The owner of the vehicle can attach by drilling holes in the vehicle and attaching the air flow device to the base of the window permanently, preferably with rubber in between the air flow device and the base of the window. It is advisable to use self-tapping screws. This arrangement permits the rear window to be closed or opened as desired.

Due to the design of the invention device, entry into the vehicle by an unwanted person is extremely difficult.

BRIEF DESCRIPTION OF THE DRAWINGS

Referring to the drawing in which numerals of like character designate similar part throughout the several views:

The FIGURE is a perspective view of the air flow device of an embodiment of the invention mounted in a car window.

DETAILED DESCRIPTION OF THE INVENTION

The preferred embodiment of the invention are illustrated in the drawing.

In FIG. 1, numeral 100 represents the air flow device of the preferred embodiment of the invention. Device 100 is completely made of a clear material, except for any screen, pads, hinges and other indicated parts. Device 100 includes, in combination, window frame 120, two side window panes 122 and 134 mounted in window frame 120, and air flow unit 126. Air flow unit 126 includes main plate 102, side plates 104 and 106, and window frame rim 108. Side plates 104 and 106 are pliated (or pleated), with the top edge thereof straight. Side plates 104 and 106 are made of flexible, pliable clear plastic. The back edge of each of side plates 104 and 106 are affixed to the sides of window frame 102. The front edge of each of side plates 104 and 106 are affixed to vertical struts 110 and 112. The top rim of plate 102 can be moved back from window frame 120. The angle of such opening is preferably 20 degrees, but can generally be between 5 and 30 degrees, or so. The angle of offset is critical to the extent that sufficient air inflow is allowed and the angle does not become excessive, hence harmful to the passenger and destroying the desired air flow pattern. Side plates 104 and 106 are triangular shaped when air device unit 126 is in the open position. Window frame 108 is attached by rivets 116 (through holes 136) to hinge 118, which is permanently affixed by metal screws or rivets 128 to window frame 120. Window frame 120 is mounted in rear window 130 of vehicle 132, usually into a rubber grommet (not shown) affixed conventionally around the rim of rear window 130. When in the closed position, plate 102 is in the plane of window sections 122 and 124. Latch 134 (and receiver 136) locks air flow unit 126 in the closed position. Other latching, locking or fastening means can be used in place of latch 134 (136). Struts 110 and 112 reinforce the device and help prevent unlawful entry into vehicle 132.

By adjusting the position of plate 102 from plane of window frame 120, the flow of air in vehicle 114 can be adjusted.

Plate 102, pleated side plates 104 and 106 and panes 122 and 124 are preferably constructed of Uvex ®, a durable plastic which is flexible to a degree but is break-resistant. Any other suitable transparent plastic (e.g., plexiglass) or the like can also be used.

Concerning U.S. Pat. No. 1,895,109 (Suddards), the stated air flow pattern is the reverse of the air flow pattern of the air flow device of the invention. In a recreation vehicle containing a camper mounted on the bed of a pick-up truck, the passengers are permitted to ride in the camper. With the air flow device of the invention, the driver is able to communicate with those riding in the camper.

In the 1930's safety regulations were different. With Suddards' ventilator, the view is obstructed for rear view traffic for the driver—this is not so with air flow devide of the invention.

1930's vehicles had many holes in the floor, e.g., with the clutch, foot brake, hand brake, floor shifting and battery case; this permitted Suddards to draw air and fumes up through the vehicle's floor. With all windows closed, this allowed Suddards to form a vacuum in the vehicle, thus permitting all of the air to be drawn up through the floor of such vehicles. With the air flow device of this invention, there is no vacuum. With the invention, fresh flow of air over the recreation vehicle enters all the time, thus making the recreation vehicle very comfortable and the air pleasant. Suddards' ventilator is like an exhaust fan; it draws the air out from all three sides. The air flow device of the invention is not an exhaust exit or an air exit; the air from the air flow device is drawn in and distributed in the cab of the vehicle.

The air flow device of the invention is one solid component; it requires no cables, chains, rods or louvers to operate; it is made of a solid material (with only a possible cap or flap on top of the device).

The purpose of the air flow device of the invention is to supply the driver and/or passengers in the vehicle with a continuous supply of air. This is accomplished without the use of louvers on its structure. When vehicle side windows are closed, Suddards' device is not in use in modern vehicles with the side windows open or closed, the air flow device of the invention provides a continuous flow of air. In pick-up trucks, the rear window is located higher than the driver or passenger thus permitting the air to flow over and above the heads of the occupants of such vehicles.

In the air flow device, all metal to metal joinders are preferably welds. Preferably, non-abrasive padding material (strips) are provided for all surfaces in contact with paint.

Some of the advantages of the air flow device of the invention are: flow of air over the head of a passenger and stops the blowing of hair and prevents sore necks, shoulders, arms, etc.; there are no drafts, no water from rain can enter the cab, no water enters the cab while the truck (motor vehicle) is in motion or is standing still; prevents windows from fogging up in a rainstorm (when the motor vehicle is moving); even with the side windows closed, there is continuous air flow; there is better control of the air flow in the cab of the truck (motor vehicle) while driving; if the weather permits and a person is using the invention air flow device, there is a strong possibility that no carbon monoxide poisoning can enter the vehicle due to the fact that the rear window is open and has a flow of air therethrough; and if all of the air flow device located in the rear window itself is made of plexiglass, one can see through all of the rear windows.

As used herein, the term "motor vehicle" includes pick-up trucks, flat bed trucks, vans, four-wheel drive vehicles (flat backed), truck cabs, pick-up trucks and the like with campers mounted thereon, truck trailers, and recreation vehicles including travel trailers, motor homes and campers. As used herein, the term "boats"

includes those having a vertical, flat rear wall on the cabin.

When using the air flow device, there is less chance of carbon monoxide poisoning in the cab of the vehicle due to the continuous flow of air. Some vehicles have faulty exhaust systems, and while driving, carbon monoxide may enter the vehicle; however, by using the device, there is a continuous flow of air which prevents the driver from becoming nauseated or becoming sleepy, thereby preventing an accident. Flow of air is directed along the top of the vehicle cab preventing sore necks, shoulders, arms, etc., and preventing occupant discomfort (e.g., stops the blowing of hair). The device eliminates drafts in cab of vehicle. When the device is used, no water from rain can enter cab of vehicle via the rear window (regardless of whether vehicle is in motion or standing still). The device prevents windows from fogging in a rainstorm while the vehicle is in motion. Even with the side wndows of the cab closed, the device still permits continuous air flow with rear window open. The device causes better air quality in cab of vehicle while driving. The device is maintenance free or requires little maintenance (e.g., no rusting, no painting, no parts to replace, no adjustment, long lasting and durable). Even though installed in the rear window of a vehicle, sight traffic to the rear (i.e., rear view) is not impaired. The device cannot be removed from the outside of vehicle, which makes unauthorized entry through the rear window extremely difficult at best.

What is claimed is:

1. An air flow device for a closed motor vehicles or boat for positioning in the rear aperture thereof, comprising, in combination, (a) a window frame which is adapted to fit in said rear aperture, said window frame having a top frame member, a bottom frame member and two side frame members, thereby forming a window opening, and at least one pane member is positioned within said window frame so as to block a portion of said window opening, said window frame having an outer edge and an inner edge, and the inner edge of said window frame not contacting said window frame being vertical, and (b) an air flow unit positioned in said window frame, said air flow unit comprising (i) a plate that is transparent in at least the central region thereof, (ii) means for attaching said air flow device to said window frame, said attachment means including pivot means which is pivotally attached to the bottom portion of said plate and to the bottom frame member of said window frame, and (iii) two vertical side members, one side of each of said side members being attached to one of said vertical members, the other side of each of said members being attached to one end of said plate, each of said side members being pleated in the vertical direction, said pleats decreasing in width in the vertical direction so as to form a point at the lower edge of said vertical member, and the upper edge of said vertical members being straight, when said plate is in an upright position so as to close said rear aperture, the pleats of said vertical side members are compressed, and when said plate is in an inwardly pivoted position so as to extend upwardly and inwardly from said rear aperture, thereby forming a gap between the top of said plate and the vertical plane of said rear aperture, the pleats of said vertical side members are expanded, thereby preventing lateral air flow into said vehicle or boat.

2. The air flow device as claimed in claim 1 wherein said side members are transparent or translucent.

3. The air flow device as claimed in claim 1 wherein said side members are made of a pliable material.

4. The air flow device as claimed in claim 1 wherein a vertical strut is affixed on its side to the vertical inner edge of each of said plate members and on its ends to the top member and bottom member of said window frame.

5. The air flow device as claimed in claim 1 wherein said plate is essentially flat.

6. The air flow device as claimed in claim 1 wherein all of said plate is transparent.

* * * * *